US008370563B2

(12) United States Patent
Lee et al.

(10) Patent No.: US 8,370,563 B2
(45) Date of Patent: Feb. 5, 2013

(54) NON-VOLATILE MEMORY SYSTEM AND ACCESS METHOD THEREOF UTILIZING A CONFIRM MARK WHEN DATA HAS BEEN SUCCESSFULLY RECORDED THEREIN

(75) Inventors: Jin-Hwa Lee, Yongin-si (KR); Woonjae Chung, Gunpo-si (KR); Jun-Ho Jang, Seoul (KR); Dong-Young Seo, Hwaseong-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 477 days.

(21) Appl. No.: 12/621,324

(22) Filed: Nov. 18, 2009

(65) Prior Publication Data

US 2010/0125702 A1 May 20, 2010

(30) Foreign Application Priority Data

Nov. 20, 2008 (KR) ........................ 10-2008-0115711

(51) Int. Cl.
*G06F 12/00* (2006.01)
*G06F 13/00* (2006.01)
(52) U.S. Cl. ........ 711/103; 711/162; 711/202; 711/206; 714/2; 365/185.09; 365/185.33
(58) Field of Classification Search .................. 711/103, 711/162, 202, 206; 365/185.09, 185.33; 714/2, 6, 7
See application file for complete search history.

(56) References Cited

U.S. PATENT DOCUMENTS

| | | | | |
|---|---|---|---|---|
| 5,544,312 A * | 8/1996 | Hasbun et al. | .................. | 714/42 |
| 6,189,081 B1 * | 2/2001 | Fujio | ............................ | 711/171 |
| 6,601,132 B2 * | 7/2003 | Nomura et al. | ................ | 711/103 |
| 7,181,672 B2 * | 2/2007 | Atri et al. | ........................ | 714/763 |
| 2005/0036390 A1 * | 2/2005 | Nakada et al. | ................. | 365/232 |
| 2006/0002197 A1 * | 1/2006 | Rudelic | ..................... | 365/189.09 |
| 2006/0069851 A1 * | 3/2006 | Chung et al. | ................... | 711/103 |
| 2007/0168837 A1 * | 7/2007 | Murin | ........................... | 714/763 |
| 2008/0140920 A1 * | 6/2008 | Kamiya et al. | ................. | 711/103 |
| 2008/0155317 A1 * | 6/2008 | Kim et al. | ......................... | 714/8 |
| 2008/0215954 A1 * | 9/2008 | Oshikiri | ......................... | 714/764 |
| 2008/0291733 A1 * | 11/2008 | Shen et al. | .............. | 365/185.18 |
| 2009/0073762 A1 * | 3/2009 | Lee et al. | .................. | 365/185.03 |
| 2009/0164704 A1 * | 6/2009 | Kanade et al. | ................ | 711/103 |
| 2009/0313422 A1 * | 12/2009 | Lin et al. | ......................... | 711/103 |
| 2011/0072194 A1 * | 3/2011 | Forhan et al. | .................. | 711/103 |

FOREIGN PATENT DOCUMENTS

| | | |
|---|---|---|
| JP | 05-265785 | 10/1993 |
| JP | 11-203878 | 7/1999 |

OTHER PUBLICATIONS

English Abstract for Publication No. 05-265785.
English Abstract for Publication No. 11-203878.
Sunhwa Park, et al., "Atomic Write FTL for Robust Flash File System," pp. 155-160.
US 7,337,190, 02/2008, Barrall et al. (withdrawn)

* cited by examiner

*Primary Examiner* — Hong Kim
(74) *Attorney, Agent, or Firm* — F. Chau & Associates, LLC

(57) ABSTRACT

Disclosed is a method for accessing a non-volatile memory device using a flash translation layer. The method includes receiving a write request for data from a file system and recording the data in the non-volatile memory device in response to the write request. The flash translation layer is informed whether a confirm mark for the data is recorded or not from the file system.

14 Claims, 10 Drawing Sheets

Fig. 5

FTL_Write(Lsn, nSectorCount, pBuffer, Attr);

| Parameter | Explanation |
|---|---|
| Lsn | Start sector address |
| nSectorCount | Number of sector |
| pBuffer | Buffer address of file |
| Attr | A variable for communication with the file system |

NON-VOLATILE MEMORY SYSTEM AND ACCESS METHOD THEREOF UTILIZING A CONFIRM MARK WHEN DATA HAS BEEN SUCCESSFULLY RECORDED THEREIN

CROSS-REFERENCE TO RELATED APPLICATIONS

This application claims priority under 35 U.S.C. §119 to Korean Patent Application No. 10-2008-0115711, filed on Nov. 20, 2008, the entirety of which is hereby incorporated by reference.

BACKGROUND

TECHNICAL FIELD

The present invention relates to a non-volatile memory system. More particularly, the present invention relates to a non-volatile memory system and access method thereof.

In general, an operating system (OS) uses a file system to manage data stored on the computer system on which it is installed. The file system is the means by which the OS organizes and manages files. For example, MICROSOFT WINDOWS, a line of operating systems by Microsoft Corporation, provides a format command to configure such a file system and to initialize a mass storage device such as a hard disk drive (HDD) or a solid-state drive (SSD). After the file system is configured on the mass storage device, a user may store or delete files from the device. Various operating systems utilize diverse file systems. For example, MICROSOFT WINDOWS operating systems adopt file systems such as FAT (File Allocation Table) and NTFS (New Technology File System). Operating systems in Unix/Linux families adopt file systems such as UFS (Unix File System), EXT2 (Extended 2), EXT3 (Extended 3), JFS (Journaling File System), and the like.

As discussed above, examples of mass storage devices include HDDs and SSDs. A SSD is a mass storage device that uses flash memory in a physical arrangement that is generally interchangeable with a HDD. However, flash memories of other types are also widely used as mass storage devices. For example, memory cards, USB thumb drives and the like are also examples of mass storage devices that utilize flash memory. As the use of portable information appliances such as cellular phones, PDAs, digital cameras, etc. is rapidly increased; flash memory is widely used as a storage device instead of a hard disk.

In dealing with flash memory, an erase operation must be conducted prior to writing data on memory locations that already contain data. Moreover, flash memory must generally be erased in units of memory that are greater than the units of memory that the flash memory may be written in. Such properties make it difficult to use a flash memory as a main memory. Further, in a case where a flash memory is used as an auxiliary memory, such properties make it difficult to apply a file system that was designed for a hard disk directly to the flash memory device. A Flash Translation Layer (hereinafter, referred to as 'FTL') is used between a file system and a flash memory to optimize write and erase operations for the flash memory in a manner that is transparent to the file system. At a write operation of the flash memory, the FTL converts a logical address generated by the file system into a physical address of a flash memory where an erase operation is to be conducted. This is called an address mapping function/operation. A host may then recognize a flash memory as a hard disk drive (or, SRAM) via the address mapping function of the FTL to access the flash memory in the same manner as the hard disk drive.

SUMMARY

Exemplary embodiments of the incentive concept are directed to provide a method and memory system capable of increasing the performance of a data write operation with respect to a non-volatile memory device.

An exemplary embodiment of the present inventive concept is directed to provide an access method of a non-volatile memory device using a flash translation layer. The access method includes receiving a write request for data from a file system and recording the data in the non-volatile memory device in response to the write request. The flash translation layer is informed, by the file system, whether or not a confirm mark for the data is recorded.

An exemplary embodiment of the present inventive concept is directed to provide an access method of a non-volatile memory device using a flash translation layer. The access method includes generating a file including user data and a plurality of meta data in response to a write request and requesting the flash translation layer to record the user data or the plurality of meta data in the non-volatile memory device. The flash translation layer is then informed whether or not to write a confirm mark. The confirmation mark is recorded in the non-volatile memory device via the flash translation layer according to an attribute of the user data or the plurality of meta data. The flash translation layer records a confirm mark for the user data or the plurality of meta data according to the informing.

According to an exemplary embodiment of the present inventive concept, a memory system includes a host for driving a file system and a non-volatile memory device for storing a file provided from the host. When the file is recorded in the non-volatile memory device, the non-volatile memory device selectively records a confirm mark corresponding to each of a plurality of data forming the file according to an instruction of the host.

BRIEF DESCRIPTION OF THE FIGURES

Non-limiting and non-exhaustive exemplary embodiments of the present inventive concept will be described with reference to the following figures. Like reference numerals may refer to like parts throughout the various figures. In the figures:

FIG. 5 is a table showing a FTL write function according to an exemplary embodiment of the present inventive concept;

DETAILED DESCRIPTION OF THE EXEMPLARY EMBODIMENTS

Exemplary embodiments of the present inventive concept utilize a flash translation layer (FTL) that generates a confirm mark which indicates that writing of write-requested data to a non-volatile memory device is completed. The confirm mark is used to recover data damaged due to abnormal power failure caused during a write operation. The confirm mark includes information stored in a non-volatile memory device to indicate whether a write operation requested from a file system has been successfully completed. The FTL may judge whether data has been successfully recorded based on the presence of the confirm mark. Although exemplary embodiments of the present inventive concept may utilize any file system, for convenience of description, FAT32 will be used as an exemplary file system.

Figure 1:
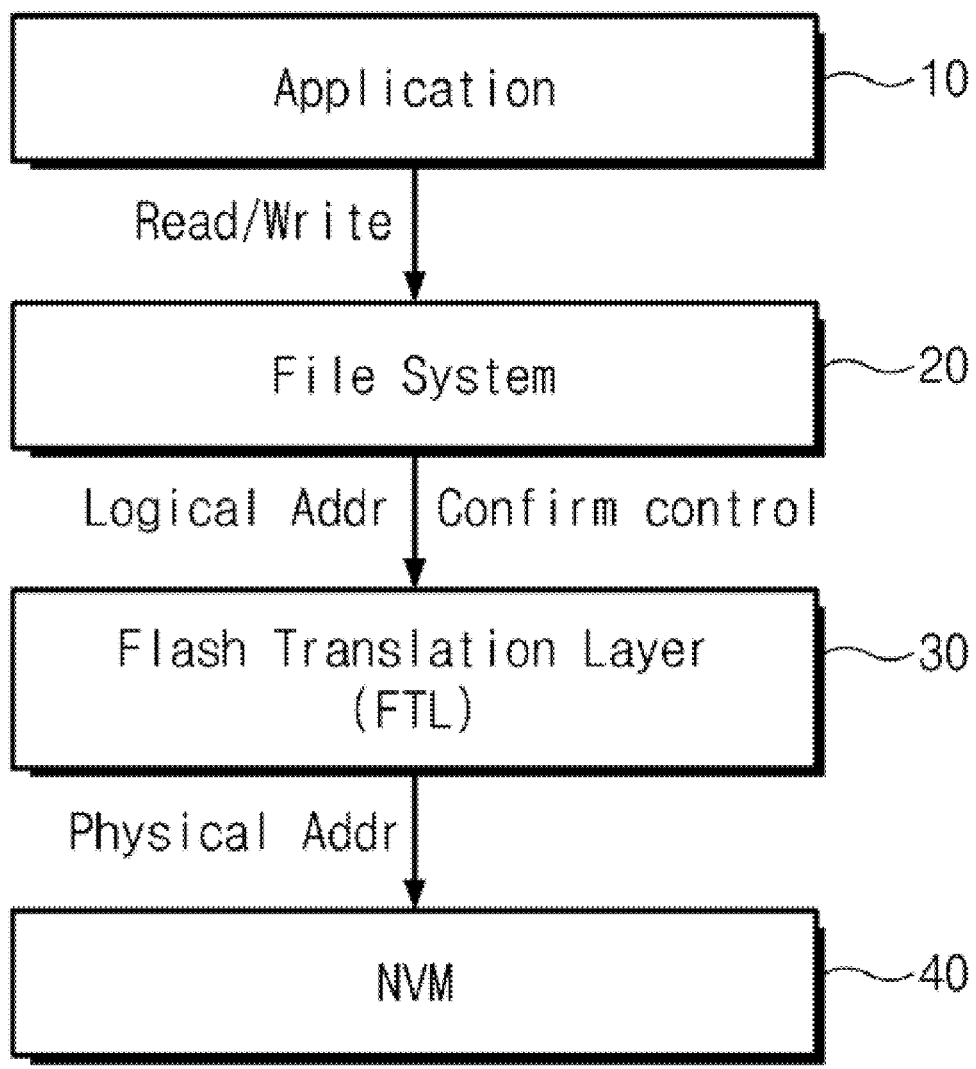
FIG. 1 is a block diagram showing a file system architecture according to an exemplary embodiment of the present inventive concept.

FIG. 1 is a block diagram showing the file system architecture of a computer system which uses a flash memory as a storage medium. Referring to FIG. 1, a flash memory file system includes an application program 10, a file system 20 for generating and managing files, and a flash translation layer 30. Access to a non-volatile memory device 40 may be conducted via such layers 10, 20, and 30.

The application program 10 may be a program installed on a system for specific purposes. The file system 20 generates and stores files according to the application program 10. The file system 20 is defined as a set of abstract database structures for storing, searching, accessing, and handling a database hierarchically. The file system 20 provides user data to a user and associates meta data having control information for each file of user data. The flash translation layer 30 operates responsively to an access request (denominated in sector units) from the file system 20 and performs a write or read operation by an access unit (denominated un units of a block or a page) of the non-volatile memory device 40.

As described above, data managed by the file system 20 may be divided into user data and meta data for managing the user data. The user data includes data write-requested by the application program 10 or a user. In order to make one file according to the write request, there may be recorded meta data such as a FAT table, a directory entry, log information for restoration, and the like. The file system 20 makes a file and sends user data and meta data to the flash translation layer 30 by a file unit so as to be recorded in the non-volatile memory device 40. The flash translation layer 30 converts a logical address sent along with the user data and the meta data into a physical address and writes the user data and the meta data in the non-volatile memory device 40. An access unit of the flash translation layer 30 may be a page or block. The flash translation layer 30 records a confirm mark in the non-volatile memory device 40 after data of an access unit is written in the non-volatile memory device 40. The confirm mark corresponding to data recorded in the non-volatile memory device 40 may be used as information for recovering data of a page, sector, or specific size. For example, in a case where power failure arises during a program operation, programmed data including a confirm mark at a recovery procedure may be judged as valid data. The flash translation layer 30 writes a confirm mark irrespective to all write requests, but with respect to a write request of a data unit assigned by the file system 20. The memory system according to an exemplary embodiment of the present inventive concept is capable of reducing overhead of a write operation according to a manner of writing a confirm mark as above described.

Figure 2:
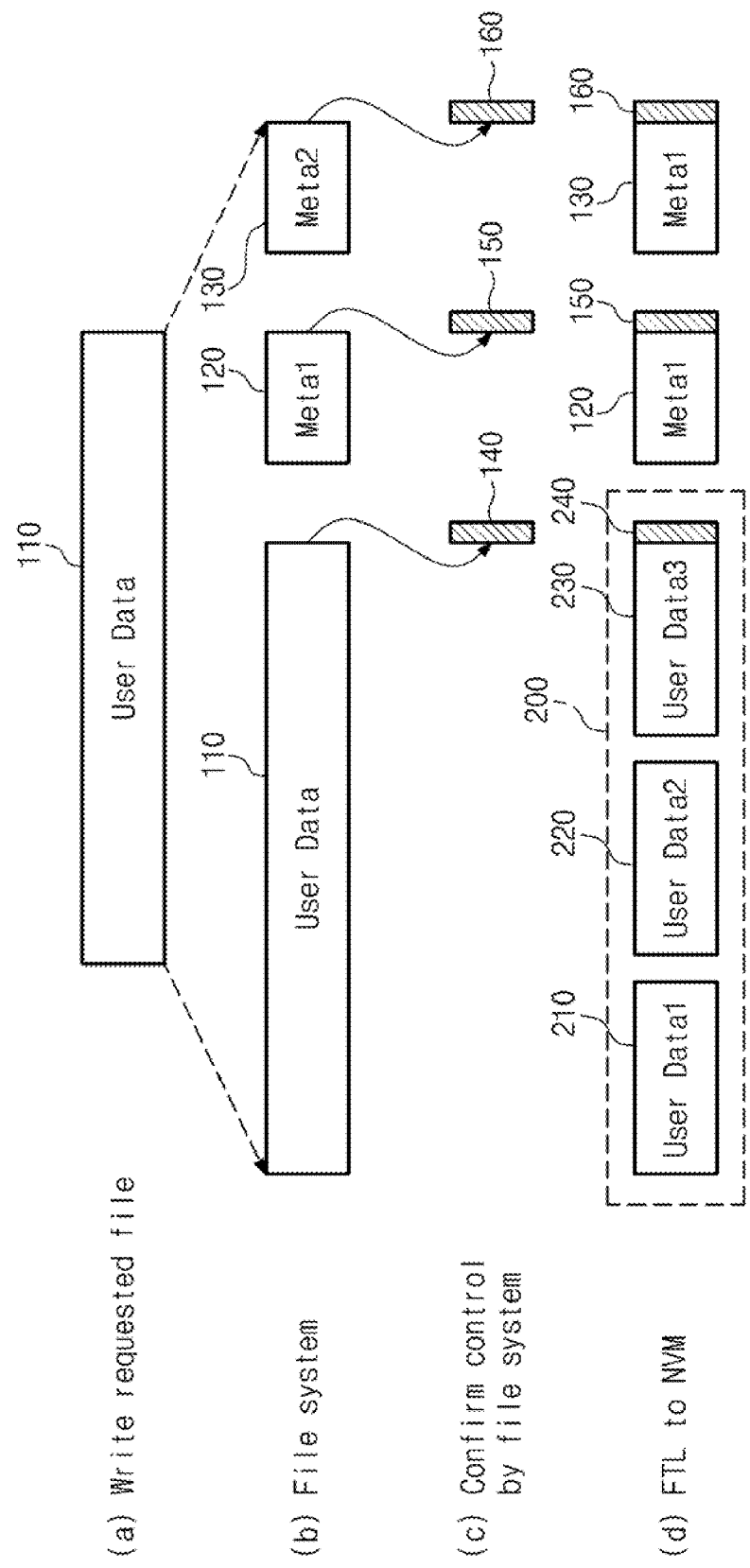
FIG. 2 is a diagram showing a write operation according to an exemplary embodiment of the present inventive concept.

FIG. 2 is a diagram showing write timing of confirm marks of a flash translation layer controlled by a file system. Referring to FIG. 2, there will be respectively described program steps where a file is programmed in a non-volatile memory device 40.

Step (a) shows a write request for a file from a user or an application program. It is assumed that a file write-requested from the application program or user consists of user data 110. A file system 20 opens a write-requested file and closes it after a requested write operation is completed. The opened file may be a file which previously exists in the non-volatile memory device 40 or which is newly assigned. The file system 20 is directed to safely record a write-requested file in the non-volatile memory device 40.

In step (b), the file system 20 assigns a file name and a file size to the write-requested file 110. In particular, the file system 20 generates a plurality of meta data 120 and 130 from the user data 110 to manage and control the file. The meta data 120 and 130 may include, for example, control information for the user data 110, recovery information needed at power failure, and the like.

In step (c), the file system 20 sends a write request to the flash translation layer 30. The file system 20 sends one write request for each of the confirm marks 150 and 160 to the flash translation layer 30 with respect to a write request for each of the meta data 120 and 130. Further, the file system 20 sends one write request for a confirm mark 140 to the flash translation layer 30 with respect to the user data 110. Although a file size of the user data 110 is large, the file system 20 allots one write request of the confirm mark with respect to write-requested user data 110.

In step (d), a write operation of a non-volatile memory device is shown. The write operation is controlled by a flash translation layer 30 according to a request of the file system 20. If a file size of the user data 110 write-requested from the file system 20 is more than a transaction unit of the non-volatile memory device 40, the user data 110 may be programmed in the non-volatile memory device 40 via a plurality of transactions. If programming of the meta data 120 having a relatively small size is completed, a confirm mark 150 corresponding to the meta data 120 is programmed. When programming of the meta data 130 is ended, a confirm mark 160 corresponding to the meta data 130 is programmed. User data is sent to the flash translation layer 30 via a plurality of transactions. For example, complete user data 200 may be divided into a plurality of sub user data 210, 220, and 230 divided by a transaction unit may be transferred to the flash translation layer 30 from the file system 20. At a write request for the sub user data 210, the file system 20 does not instruct writing of a confirm mark. Likewise, at a write request for the sub user data 220, the file system 20 does not direct writing of a confirm mark. On the other hand, at a write request for a final sub user data 220 in the write-request user data 110, the file system 20 directs the flash translation layer to write a confirm mark 140. Accordingly, the flash translation layer 30 records a confirm mark 240 once with respect to one user data 200.

In the memory system of an exemplary embodiment of the present inventive concept, since writing of confirm marks is managed by the file system 20, the confirm marks are prevented from being recorded, when the data is not correctly written, by the flash translation layer 30. Accordingly, it is possible to prevent an invalid file from being generated when an opened file is not closed in the file system 20.

Figure 3:
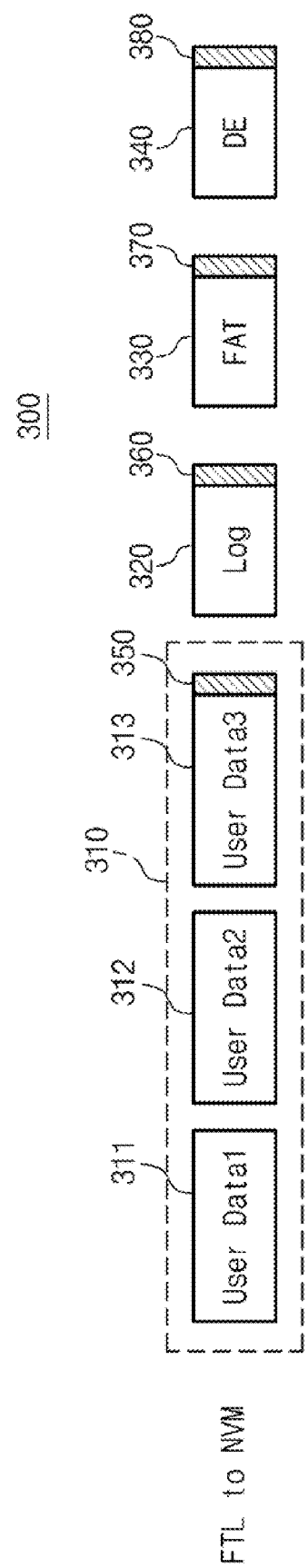
FIG. 3 is a diagram showing recoding of a file in a non-volatile memory device according to an exemplary embodiment of the present inventive concept.

FIG. 3 is a diagram showing recoding of a file in a non-volatile memory device according to an exemplary embodiment of the present inventive concept. Referring to FIG. 3, a file system 20 produces meta data from write-requested user data. The meta data 300 may include log information 320, a FAT table 330, a directory entry 340, and the like. The file system 20 directs writing of a log information confirm mark 360 when it requests writing of the log information 320 to the flash translation layer 30. The file system 20 directs writing of a FAT table confirm mark 370 to the flash translation layer 30 at a write request of the FAT table 330. The file system 20 directs writing of a directory entry confirm mark 380 to the flash translation layer 30 at a write request of the directory entry 340. The file system 20 issues a write request to the flash translation layer 30 such that a plurality of sub user data 311, 312, and 313 of a complete user data 310 are recorded and a confirm mark 350 is finally recorded once following the final sub user data 313. Each of the sub user data 311, 312, and 313 corresponds to one transaction amount between the file system 20 and the flash translation layer 30. The file system 20 instructs the flash translation layer 30 to record the confirm mark 350 at a point of time when a sub user data 313 final write-request is recorded.

Because the file system determines writing of confirm marks, a data protecting operation independently executed at a lower layer is surrendered to an upper layer. A lower layer such as the flash translation layer 30 does not recognize the level of importance and worth of data transferred by a transaction unit at a write request for one file. Accordingly, the lower layer manages all data with the same weight, which acts as a factor that may limit the speed of a memory system. However, a data write number may be reduced by surrendering a part of a data protecting operation to an upper layer of determining the level of importance of data constituting a file. Thus, it is possible to reduce a write number of confirm marks as described above.

Figure 4:
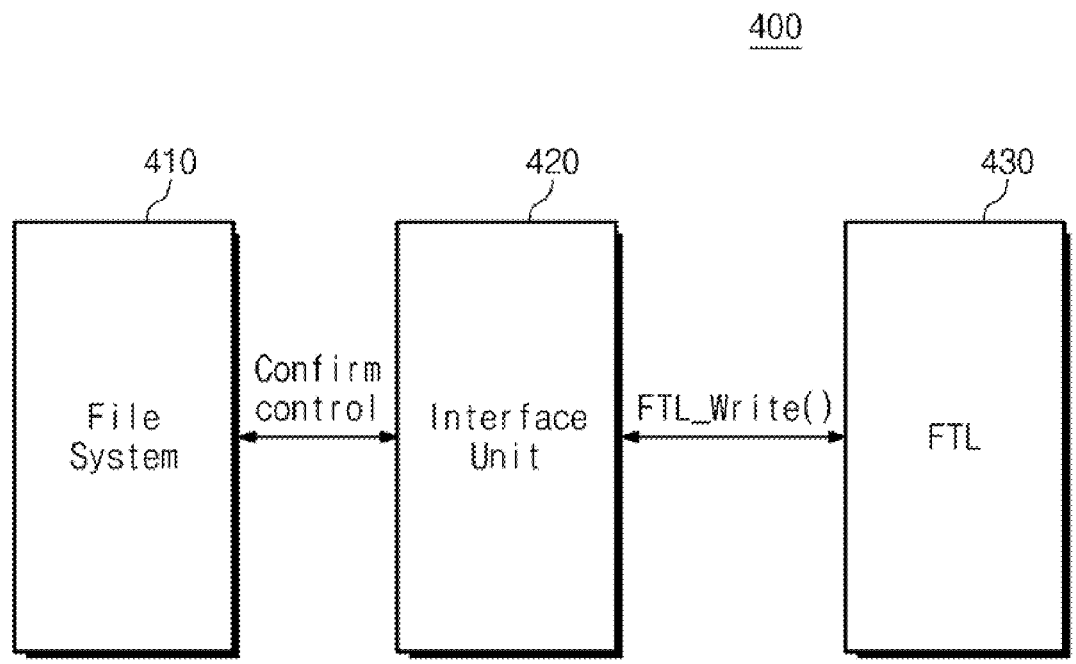
FIG. 4 is a block diagram showing an interface relationship between a FTL and a file system according to an exemplary embodiment of the present inventive concept.

FIG. 4 is a block diagram showing an interface relationship 400 between an FTL and a file system according to an exemplary embodiment of the present inventive concept. Referring to FIG. 4, there are illustrated a write request of a file system 410 and a response of a flash translation layer 430 corresponding to the write request.

If generation of a file is successfully completed, the file system 410 requests a write operation for user data, which is made according to the generation of the file, or meta data to the flash translation layer 430. At a write request, the file system 410 requests a start sector number and a sector count, which are currently available, to the flash translation layer 30. One write request is treated by one transaction in a position of the flash translation layer 430. The file system 410 refers to the start sector number and the sector count provided from the flash translation layer 30 to instruct whether data provided via one transaction and a confirm mark are written. At a write operation for meta data, the file system 410 instructs the flash translation layer 430 via an interface unit 420 to write meta data and a confirm mark with reference to the start sector number and the sector count from the flash translation layer 430. Accordingly, the file system 410 refers to the start sector number and the sector count from the flash translation layer 430 and instructs the flash translation layer 430 to write a confirm mark to data corresponding to each of the log information, the FAT table, and the directory entry. However, at a write request of user data, the file system 410 refers to the start sector number and the sector count from the flash translation layer 430 and instructs the flash translation layer 430 to write each of divided sub user data, with a confirm mark recorded at a transaction where final sub user data is recorded. As will be described below, although sub user data is not final sub user data, a confirm mark can be recorded when sub user data is recorded at a logical block following a logical block where a part of the sub user data is recorded. It is assumed that a block is filled before a write operation is completed. In this case, although a current transaction is not a final transaction of user data, a confirm mark is recorded at the filled block to protect presently recorded information.

The flash translation layer 430 provides the interface unit 420 with a function for receiving from the file system 410 information indicating whether or not to write a confirm mark. As illustrated in FIG. 4, in order to obtain information for a write request provided from the file system 410, the flash translation layer 430 provides a write function FTL_Write( ) Parameters in the write function FTL_Write( ) may include a start sector number, a sector count, a buffer address for storing data, and the like which are requested by the file system 410. In addition, the parameters in the write function FTL_Write( ) may further include a variable for requesting whether or not to write a confirm mark with respect to write-request data. The flash translation layer 430, which receives whether or not to write a confirm mark, records or skips a confirm mark for a corresponding transaction in response to the variable for requesting whether or not to write a confirm mark FIG. 5 is a table showing a parameter configuration of a write function FTL_Write( ) described in FIG. 4. Referring to FIG. 5, a flash translation layer 430 sends the following write function to receive from a file system 410 whether or not to write a confirm mark.

FTL_Write(Lsn, nSectorCount, pBuffer, Attr);

A parameter Lsn indicates an address of a write start sector for user data or meta data at a corresponding transaction. A parameter nSectorCount indicates a sector count used to record write-request data. A parameter pBuffer indicates a buffer address where write-requested data is to be stored. A parameter Attr is used to surrender judging of a write point of time of a confirm mark to a file system 410. Accordingly, the parameter Attr is used to exchange information for a write operation with the file system 410.

Figure 6:
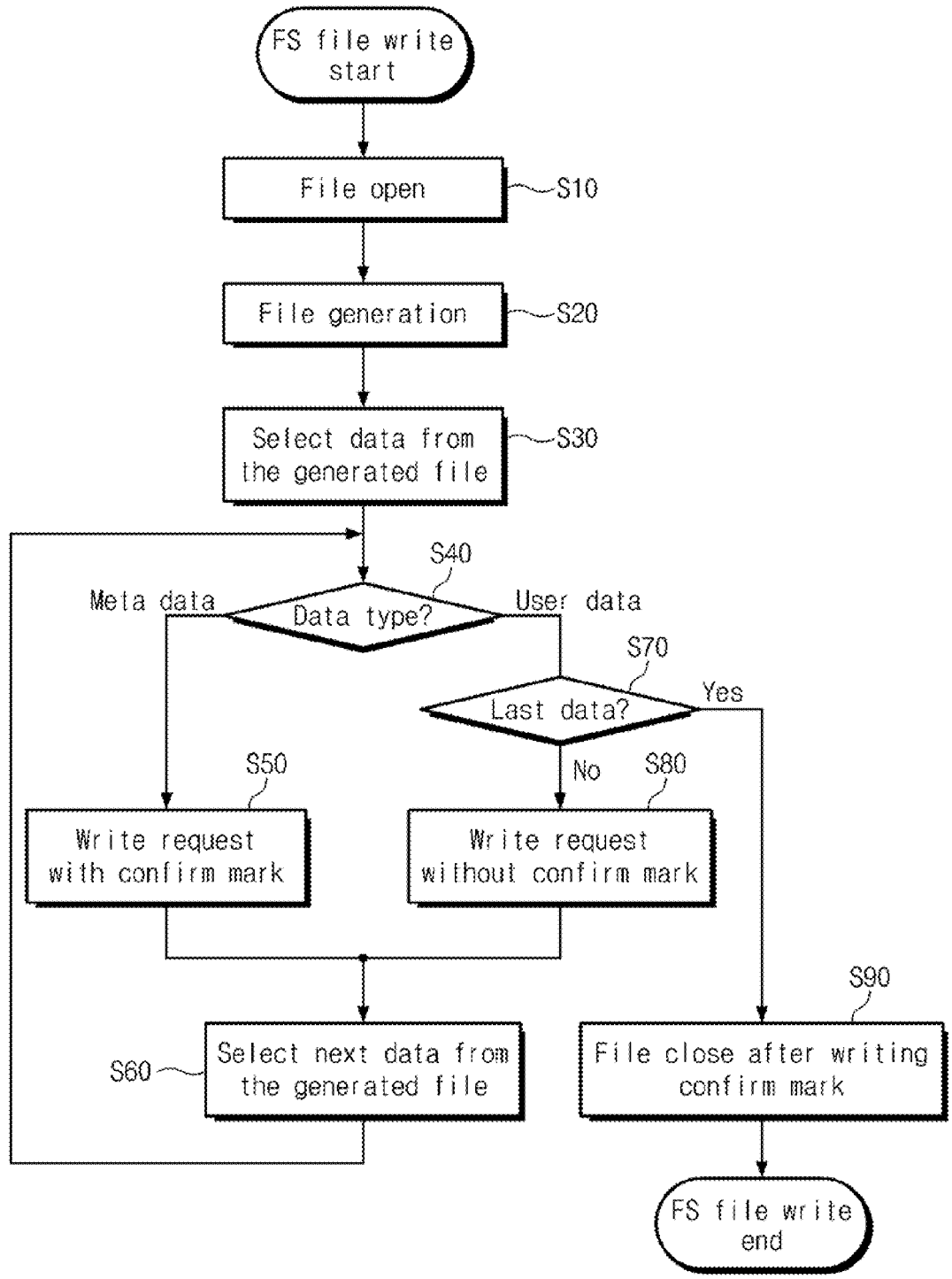
FIG. 6 is a flowchart showing an operation of a file system according to an exemplary embodiment of the present inventive concept.

FIG. 6 is a flowchart showing a write request method of a file system according to an exemplary embodiment of the present inventive concept. An operation of a file system 410 for writing one file will be more fully described with reference to FIGS. 4 and 6.

If a file writing operation is requested from a user or an application, a file system 410 starts a write operation where a write-requested file is recorded in a non-volatile memory device. In step S10, the file system 410 opens the write-requested file. In step S20, the file system 410 generates meta data from the opened file. The meta data may include log information, a FAT table, a directory entry, and the like. The file system 410 may select one of a set of data constituting a file to request a write operation for the generated file. For example, in step S30, the file system 410 may select one of user data and meta data such as the log information, the FAT table, and the directory entry. In step S40, the file system 410 determines the type of the selected data. If the selected data is meta data, each meta data generated according to each function is protected. Accordingly, in step S50, the file system 410 instructs a flash translation layer 430 to write a confirm mark when it requests a write operation for each selected meta data of a selected transaction unit. If a requested write operation for the first-selected meta data is completed, in step S60, the file system 410 may select one of a set of data constituting the generated file to request a next write operation. The file system 410 returns to the step S40 in which a file type is determined for a write operation of next selected data.

If the file type of the selected data is user data in step S40, the procedure goes to step S70, in which a write operation for user data is requested. A confirm mark is recorded at a final write request of user data. Accordingly, in step 70, it is judged whether selected user data is final sub user data being write-requested. If the selected user data is not the final sub user data being write-requested (No, step S70), the file system 410 instructs the flash translation layer 430 to write the selected sub user data without writing of a confirm mark in step 80 and a next data is selected in step S60. A write request for sub user data not needing writing of a confirm mark is repeated until a write operation for final sub user data is requested (Yes, step S70).

When, in step S70, selected sub user data is judged to be final sub user data constituting a write-requested file (Yes, step S70), the file system 410 instructs the flash translation layer 430 to write the selected sub user data and a confirm mark corresponding to the selected sub user data. If there is completed a write operation for the selected sub user data and the confirm mark corresponding to the selected sub user data, a file writing operation of the file system 410 is terminated. Thus, in step S90, the file system 410 closes the opened file.

Described above is an exemplary embodiment of the present inventive concept in which a write request of meta data is prior to a write request of user data. However, the present inventive concept is not so limited. For example, a sequence of write requests of meta data and user data can be changed. Further, a write request for user data can be completed within one transaction. Described above is an exemplary embodiment of the present inventive concept in which write requests for a set of meta data are conducted within one transaction. However, a write request for one meta data can be conducted via a plurality of transactions. In this case, the meta data can be protected by writing a confirm mark at every write request. For example, in a case where a write operation for log information is requested twice via two transactions, unlike user data, the file system 410 may be configured to write a confirm mark with respect to each of two write requests.

Figure 7:
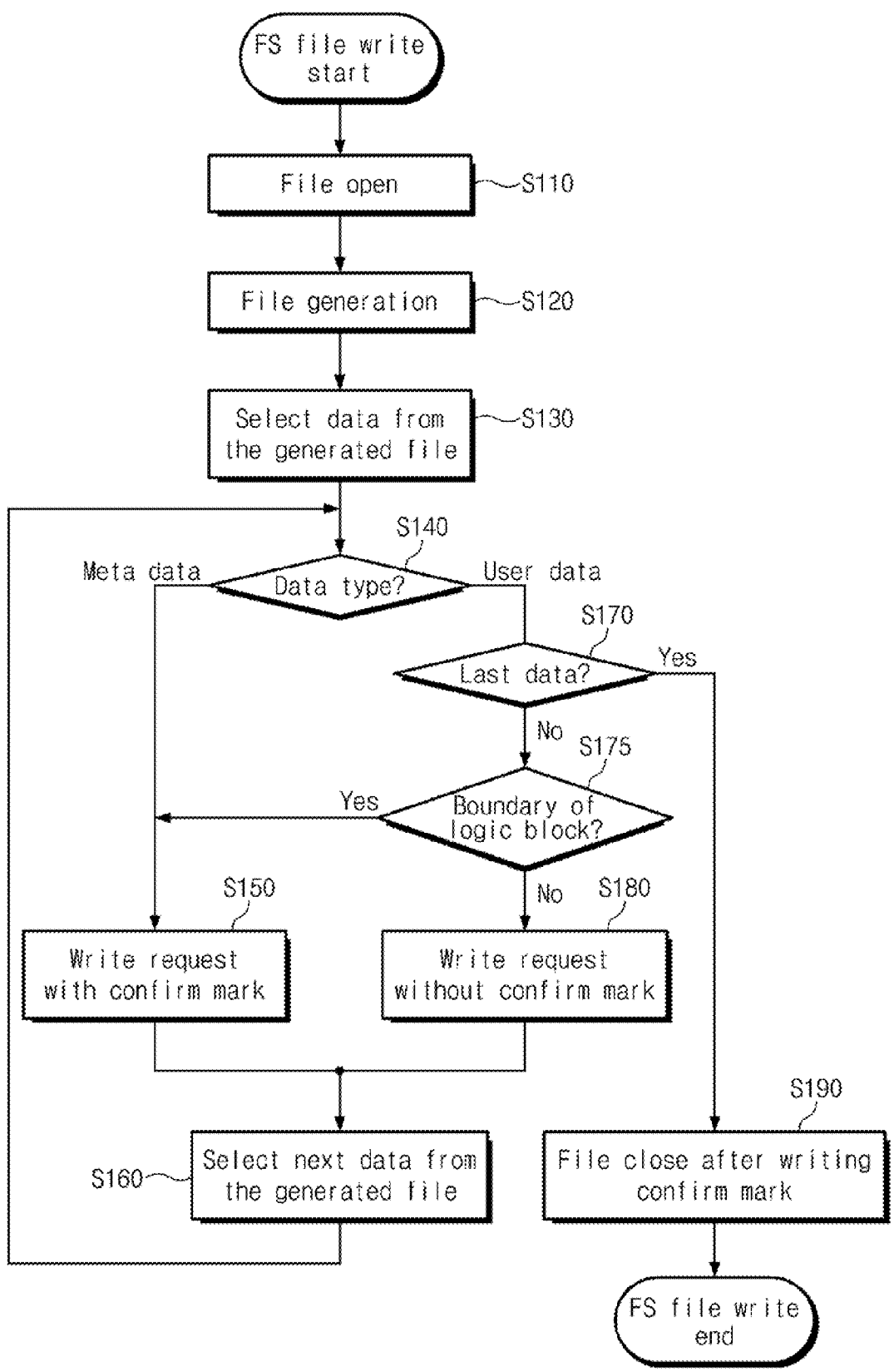
FIG. 7 is a flowchart showing an operation of a file system according to an exemplary embodiment of the present inventive concept.

FIG. 7 is a flowchart showing a write request method of a file system according to an exemplary embodiment of the present inventive concept.

If a file writing operation is requested from a user or an application, a file system 410 starts a write operation where a write-requested file is recorded in a non-volatile memory device. In step S110, the file system 410 opens the write-requested file. In step S120, the file system 410 generates meta data for the opened file. The meta data may include, for example, log information, a FAT table, a directory entry, and the like. The file system 410 may select data constituting a file and may request a write operation for the generated file. For example, in step S130, the file system 410 may select one of user data and meta data such as the log information, the FAT table, and the directory entry. In step S140, the file system 410 determines the type of the selected data. If the selected data is meta data, each meta data generated according to each function is protected. Accordingly, in step S150, the file system 410 instructs a flash translation layer 430 to write a confirm mark when it requests a write operation for each selected meta data of a selected transaction unit. If a requested write operation for a first-selected meta data is completed, in step S160, the file system 410 may select data constituting the generated file to request a next write operation. The file system 410 returns to the step S140 in which a file type is determined to request a write operation for next data.

If one of a set of user data is selected in step S140, the procedure goes to step S170, in which a write operation for user data is requested. A confirm mark is recorded at a final write requests of user data. Accordingly, in step 170, it is determined whether selected user data is final sub user data being write-requested. If, in step S70, the selected sub user data is determined to be final sub user data constituting a write-requested file (Yes, step A170), then the file system 410 instructs the flash translation layer 430 to write the selected sub user data and a confirm mark corresponding to the selected sub user data. If there is completed a write operation for the selected sub user data and the confirm mark corresponding to the selected sub user data, a file writing operation of the file system 410 is terminated. Thus, in step S190, the file system 410 closes the opened file.

On the other hand, if the selected user data is not the final sub user data being write-requested (No, step S170), in S175, the file system 410 determines whether the selected user data is allotted to a boundary region of a write-requested logical block. When a memory region of the logical block in which the selected sub user data is recorded is insufficient (Yes, step 175), recorded data can be protected by recording a confirm mark when writing of sub user data to one logical block is requested (step S150). But, in the case that write-requested sub user data can be recorded within one logical block (No, step S175), in step S175, the file system 410 instructs the flash translation layer 430 to write the selected sub user data without writing of a confirm mark (step S180). A write request for sub user data not needing writing of a confirm mark is repeated for next data (step S160) until a write operation for final sub user data is requested (Yes, step S170).

Described above is one exemplary embodiment of the present inventive concept in which a write request of meta data is prior to a write request of user data. However, the present inventive concept is not so limited. For example, a sequence of write requests of meta data and user data can be changed. Further, a write request for user data can be completed within one transaction. Described above is one exemplary embodiment of the present inventive concept in which write requests for a set of meta data are conducted within one transaction. However, a write request for one meta data can be conducted via a plurality of transactions. In this case, the meta data can be protected by writing a confirm mark at every write request. For example, in a case where a write operation for log information is requested twice via two transactions, unlike user data, the file system 410 may be configured to write a confirm mark with respect to each of two write requests.

Figure 8:
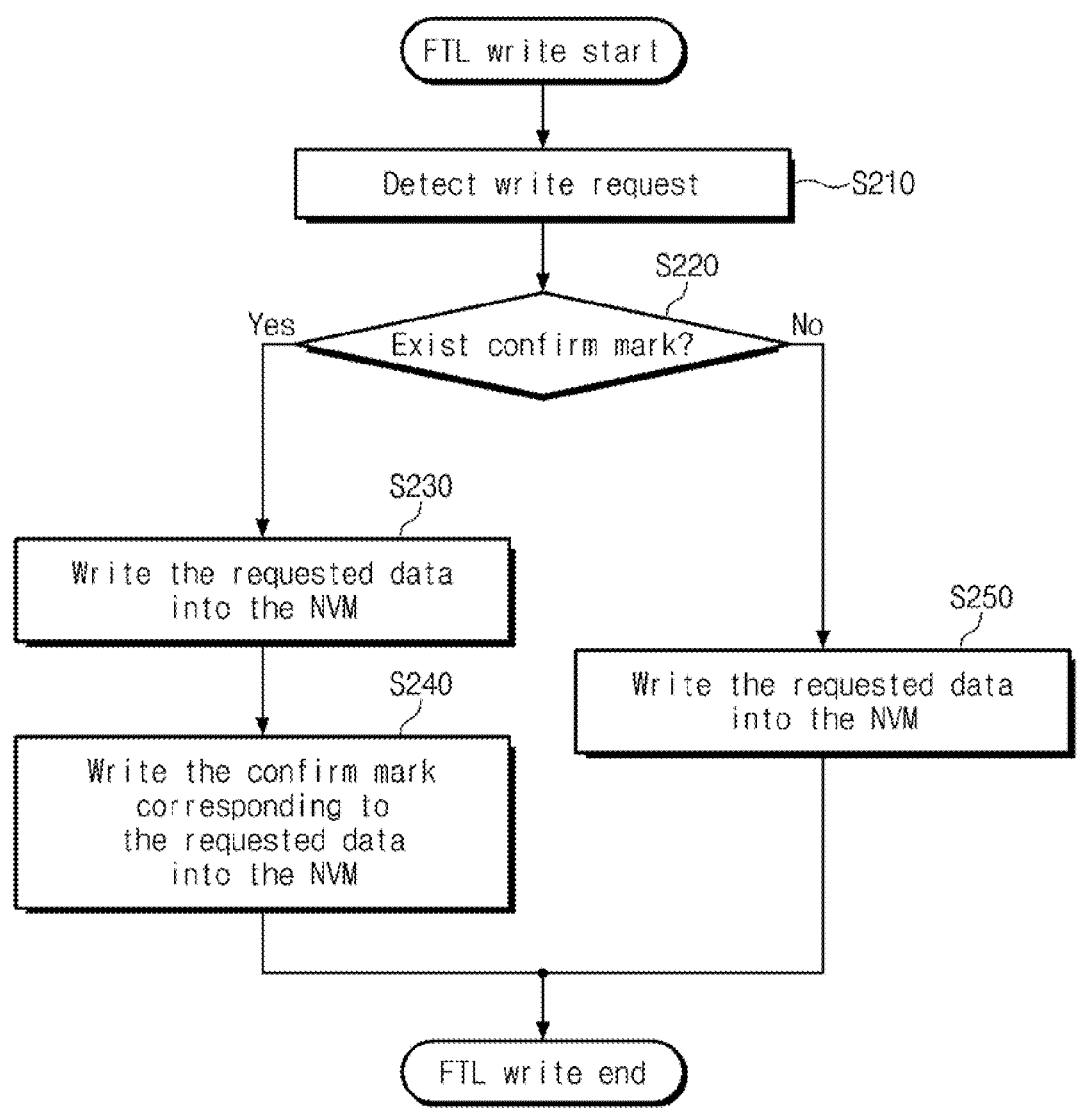
FIG. 8 is a flowchart showing a FTL operation according to an exemplary embodiment of the present inventive concept.

FIG. 8 is a flowchart showing an operation of a flash translation layer executed according to a write request of a file system. In FIG. 8, there is illustrated an operating procedure of a flash translation layer 430 according to an exemplary embodiment of the present inventive concept in which it is determined whether or not to write a confirm mark based on an instruction of a file system 410.

A write operation of the flash translation layer 430 according to a request from the file system 410 commences when a write operation is requested from the file system 410. In step S210, the flash translation layer 430 monitors whether a write request from the file system 410 is received via an interface unit 420. In the event that the write request is detected, a write function FTL_Write(int, Lsn, nSectorCount, pBuffer, Attr), for example, as described above with reference to FIG. 5, may be sent to the interface unit 420. Information indicating whether a write operation requested from the file system 410 accompanies writing of a confirm mark may be provided to the flash translation layer 430 as a response for the parameter Attr.

The flash translation layer 430 refers to the parameter Attr to determine whether or not to write a confirm mark following writing of requested data (step S220). If the information provided via the parameter Attr includes information instructing the writing of a confirm mark (Yes, step S220), then the procedure goes to step S230, in which the flash translation layer 430 makes write-requested data recorded in a non-volatile memory device. After this, in step S240, the flash translation layer 430 makes a confirm mark for protecting the write-requested data recorded in an appointed memory region of the non-volatile memory device.

On the other hand, in a case where no information provided via the parameter Attr includes information instructing writing of a confirm mark (No, step S220), in step S250, the flash translation layer 430 makes only write-requested data recorded in the non-volatile memory device. A write operation of the flash translation layer 430 executed in response to a write request is ended when a write request of data accompanying writing of a confirm mark or a write request of data not accompanying writing of a confirm mark is completed.

According to the exemplary embodiment of the present inventive concept described above, the determination as to whether or not to write a confirm mark by the flash translation layer 430 depends on an instruction of the file system 410. The flash translation layer 430 does not know the level of importance of data constituting a file. For example, in a case where a write operation for meta data used to recover data at critical errors such as power failure is requested, writing of a confirm mark for protecting such data is instructed by a file system layer. Further, write performance may be increased by minimizing a write operation of a confirm mark which is associated with elements of a file such as user data.

Figure 9:
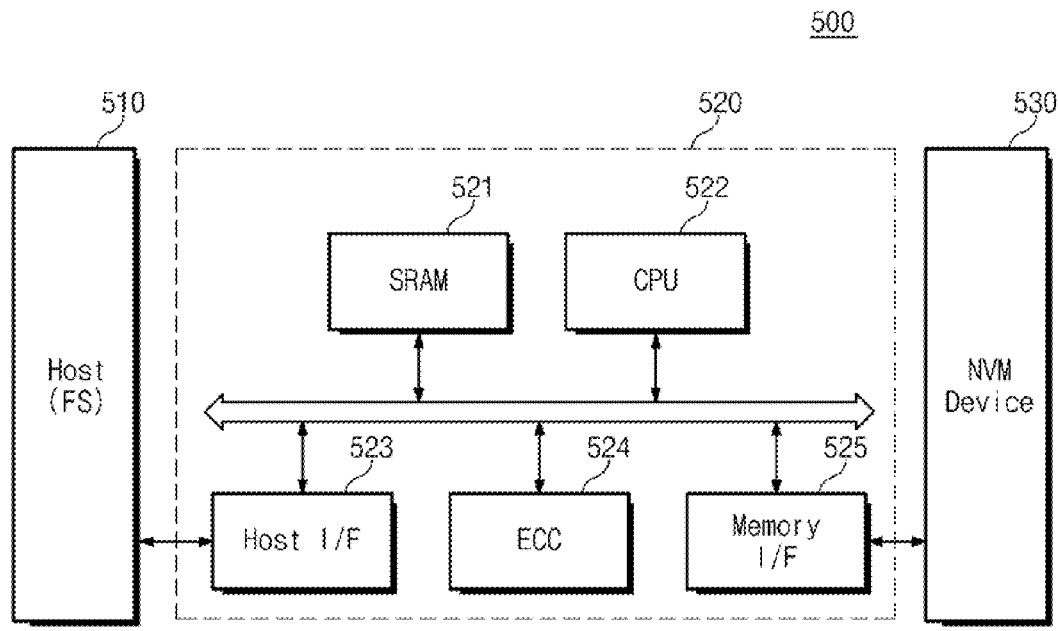
FIG. 9 is a block diagram showing a memory system according to an exemplary embodiment of the present inventive concept.

FIG. 9 is a block diagram showing a memory system 500 performing a write operation by a file system FS and a flash translation layer FTL. Referring to FIG. 9, a memory system 500 may include a host 510 where a file system FS is executed, a memory controller 520, and a non-volatile memory device 530. The memory controller 520 may be configured to control the non-volatile memory device 530. The memory controller 520 and the non-volatile memory device 530 may form a memory card or a Solid State Drive (SSD).

The host 510 may be formed of an information processing system where the file system FS of the present invention is driven. A write request of the host 510 may be conducted according to a request of a user via a user interface or a request of an application. When a write request is conducted, the file system FS classifies data according to the level of importance of data constituting a file and determines whether to write a confirm mark. The file system FS instructs whether or not to write a confirm mark according to the level of importance when it requests writing of a file to the flash translation layer installed on the memory controller 520.

The memory controller 520 records data in the non-volatile memory device 530 in response to write requests of the data and confirm mark from the file system FS. SRAM 521 is used as a work memory of a processing unit 522. A host interface 523 includes a protocol for data exchange with the host 510. An ECC block 524 detects and corrects an error in data read out from the non-volatile memory device 530. A memory interface 525 interfaces with the non-volatile memory device 530. The processing unit 522 conducts an overall control operation for data exchange of the memory controller 520.

Although not illustrated in FIG. 9, the memory system 500 further comprises ROM for storing code data for interfacing with the host 510. The non-volatile memory device 530 can be formed of a multi-chip package which includes a plurality of flash memory chips.

The memory system 500 can write data in the non-volatile memory device 530 in a high speed at a write request from a host 510. Thus, the memory system 500 can be provided as a storage medium with high density and high reliability, at a low cost. In particular, the file system FS and the flash translation layer FTL according to an exemplary embodiment of the present inventive concept can be installed on a memory system such as a Solid State Drive (SSD). In this case, the memory controller 520 may be configured to communicate with an external (for example, a host) via an interface protocols such as, for example, USB, MMC, PCI-E, SATA, PATA, SCSI, ESDI, IDE, and the like. Further, exemplary embodiments of the present inventive concept are described above where the host 510 and the memory controller 520 are separated as devices driving the file system FS and the flash translation layer FTL, respectively. But, the present inventive concept is not so limited. Driving of the FS and FTL is not so limited.

As is the case with non-volatile memory devices, a flash memory device can retain stored data even at power-off. As the use of mobile devices such as cellular phones, PDA, digital cameras, portable game consoles, and MP3 players is increased, the flash memory device is widely used as not only a data storage device but also a code storage device. The flash memory device can be applied to home applications such as HDTV, DVD, router, GPS, and the like.

Figure 10:
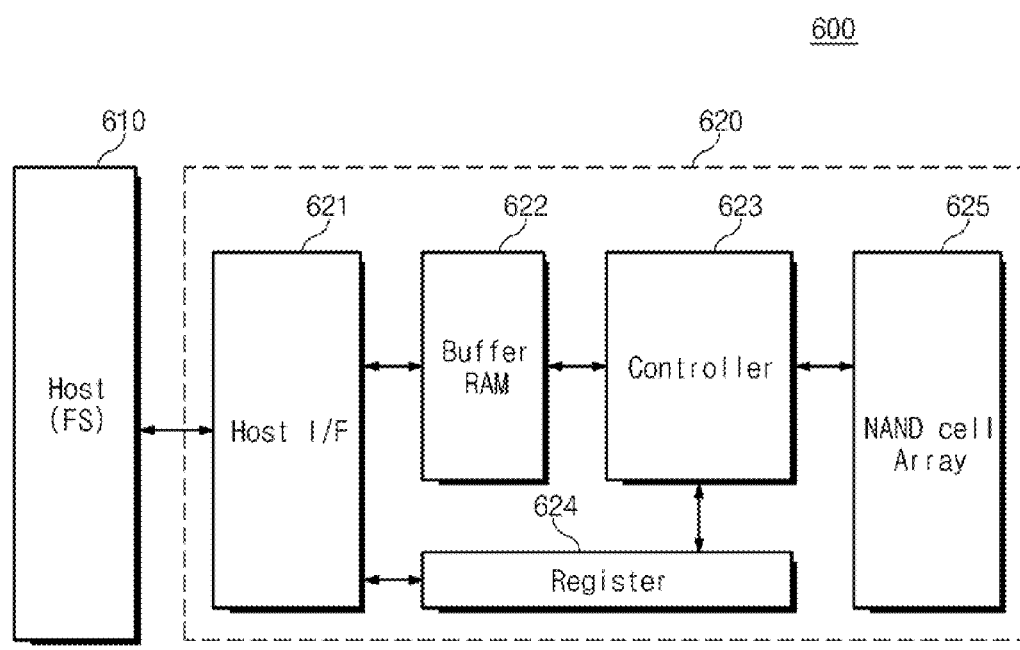
FIG. 10 is a block diagram showing a fusion memory system according to an exemplary embodiment of the present inventive concept.

FIG. 10 is a block diagram showing a fusion memory system 600 which performs a write operation by a file system FS and a flash translation layer FTL. For example, exemplary embodiments of the present inventive concept can be applied to a OneNAND flash memory device 620 marketed by Samsung Electronics, Ltd. as a fusion memory device. Referring to FIG. 10, a host 610 can be formed of an information processing system where a file system FS according to an exemplary embodiment of the present inventive concept is driven.

The host 610 requests a write operation according to a user's request via a user interface (not shown) or an application's request. When a write operation is requested, the file system FS classifies data according to the level of importance of data constituting a file and determines whether or not to write a confirm mark. The file system FS instructs whether or not to write a confirm mark according to the level of importance when it requests writing of a file to the flash translation layer FTL installed on the OneNAND flash memory device 620.

The OneNAND flash memory device 620 includes a host interface 621 for exchanging various information with devices using different protocols; a buffer RAM 622 for storing codes for driving a memory device or temporarily storing data; a controller 623 for controlling an overall operation in response to externally provided control signals and commands; a register 624 for storing commands, addresses, and configurations defining a system operating circumstance of a memory device; and a NAND flash cell array 625 formed of non-volatile memory cells and page buffers. As described above with respect to FIG. 9, exemplary embodiments of the present inventive concept are described above using an example where the host 610 and the OneNAND flash memory device 620 are separated as devices driving the file system FS and the flash translation layer FTL, respectively. But, the present inventive concept is not so limited. Driving of the FS and FTL is not so limited.

Figure 11:
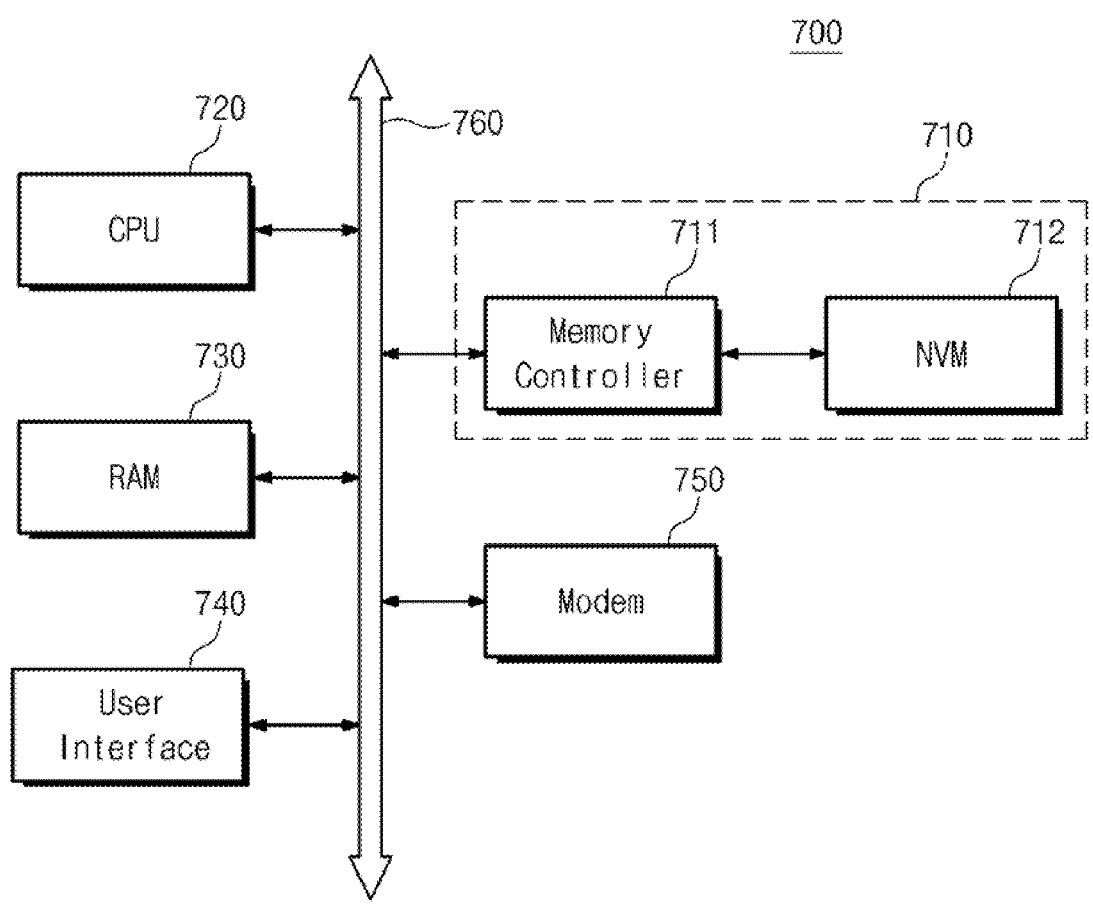
FIG. 11 is a block diagram showing a computing system according to an exemplary embodiment of the present inventive concept.

FIG. 11 is a block diagram showing a computing system 700 which performs a write operation according to an exemplary embodiment of the present inventive concept.

The computing system 700 includes a processing unit (for example, CPU) 720, RAM 730, a user interface 740, a modem 750 such as a baseband chipset, and a memory system 710 each of which is connected to a system bus 760. The memory system 710 may be configured similar to the memory systems described above with respect in FIG. 9 and/or FIG. 10. For example, the memory system 710 may include a memory controller 711 and a non-volatile memory 712. Where the computing system according to an exemplary embodiment of the present inventive concept is a mobile device, a battery (not shown) is further included in the computing system 700 to supply an operating voltage thereto. Although not illustrated in FIG. 11, the computing system 700 further comprises an application chipset, a camera image processor (CIS), a mobile DRAM, and the like. The memory system 710 may be a SSD which, for example, uses a non-volatile memory to store data. Further, the memory system 710 can be replaced with a fusion flash memory (for example, a OneNAND flash memory).

A flash memory device and/or a memory controller according to an exemplary embodiment of the present inventive concept can be packed with various packages such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

The above-disclosed subject matter is to be considered illustrative, and not restrictive. The inventive concept should not be understood to be restricted or limited by the foregoing exemplary embodiments.

What is claimed is:

1. A method for accessing a non-volatile memory device, the method comprising:
   receiving a write request for data from a host;
   recording the data in the non-volatile memory device in response to the write request; and
   writing a confirm mark for the data to the non-volatile memory, using instructions from the host, when the data has been successfully recorded to the non-volatile memory,
   wherein the host informs whether the confirm mark for the data is recorded or not,
   wherein the host instructs a flash translation layer whether or not to write a confirm mark with reference to an attribute of the data, and
   wherein when the data is user data, the host instructs the flash translation layer to write a confirm mark once.

2. The method of claim 1, wherein when the user data is greater in size than a transaction unit of the flash translation layer, the host requests a write operation for writing the confirm mark at a write operation of one of a set of sub user data forming the user data, the one sub user data being a final sub user data sent to the flash translation layer.

3. The method of claim 2, wherein when a sub user data of the set of sub user data is recorded partially in two logical blocks, the host instructs the flash translation layer to write the confirm mark after a part of the partially recorded sub user data is recorded in a logical block in which at least one sub user data is previously recorded.

4. The method of claim 1, wherein when the data is meta data, the host instructs the flash translation layer to write the confirm mark after every transaction of the flash translation layer.

5. The method of claim 4, wherein the meta data is log information, a FAT table, or a directory entry.

6. The method of claim 1, wherein the flash translation layer provides the host with a write function for exchanging information with a file system, the write function including a parameter indicating whether or not to write a conform mark.

7. A method for accessing a non-volatile memory device, the method comprising:
   receiving a write request for data from a host;
   recording the data in the non-volatile memory device in response to the write request; and
   writing a confirm mark for the data to the non-volatile memory, using instructions from the host, when the data has been successfully recorded to the non-volatile memory,
   wherein the host informs whether the confirm mark for the data is recorded or not,
   wherein the host instructs a flash translation layer whether or not to write a confirm mark with reference to an attribute of the data,
   wherein when the data is meta data, the host instructs the flash translation layer to write the confirm mark after every transaction of the flash translation layer, and
   wherein when a meta data of a set of meta data is partially recorded in two logical blocks, the host instructs the flash translation layer to write a confirm mark after a part of the partially recorded meta data is recorded in a logical block in which at least one meta data is previously recorded.

8. A memory system comprising:
   a non-volatile memory device for storing a file provided from a host; and
   a memory controller for converting a file write request of the host into a write request for the non-volatile memory device,
   wherein the memory controller selectively records a confirm mark for each of a plurality of data forming the file in the non-volatile memory device according to an instruction of the host when the data has been successfully recorded to the non-volatile memory device,
   wherein the host informs whether the confirm mark for each of the plurality of data is recorded or not,
   wherein the host instructs a flash translation layer whether or not to write a confirm mark with reference to an attribute of each of the plurality of data, and
   wherein when each of the plurality of data is user data, the host instructs the flash translation layer to write a confirm mark once.

9. The memory system of claim 8, wherein the memory controller includes the flash translation layer and the flash translation layer converts the write request of the host into the write request for the non-volatile memory device.

10. The memory system of claim 8, wherein the plurality of data includes a plurality of meta data and user data which are generated from the file.

11. The memory system of claim 10, wherein the memory controller is instructed to write the confirm mark at a write request of the plurality of meta data.

12. The memory system of claim 10, wherein the memory controller is instructed to write the confirm mark once, at a write request of the user data, regardless of a size of the user data.

13. A memory system comprising:
- a non-volatile memory device for storing a file provided from a host; and
- a memory controller for converting a file write request of the host into a write request for the non-volatile memory device,
- wherein the memory controller selectively records a confirm mark for each of a plurality of data forming the file in the non-volatile memory device according to an instruction of the host,
- wherein the plurality of data includes a plurality of meta data and user data which are generated from the file,
- wherein the memory controller is instructed to write the confirm mark once, at a write request of the user data, regardless of a size of the user data, and
- wherein when the user data is determined to be successfully recorded in the non-volatile memory device via a plurality of transactions according to a transaction size of the memory controller, the memory controller is instructed to write the confirm mark at a write operation in which a final transaction of the plurality of transactions is made between the host and the memory controller.

14. The memory system of claim 8, wherein the host device refers to an attribute of each of the plurality of data to instruct whether or not to write the confirm mark.

* * * * *